(12) United States Patent
Stork et al.

(10) Patent No.: US 8,840,315 B2
(45) Date of Patent: Sep. 23, 2014

(54) SPLIT BEARING CAGE

(75) Inventors: Josef Stork, Gerolzhofen (DE); Bernd Eich, Fuchsstadt (DE)

(73) Assignee: Aktiebolaget SKF, Gothenburg (SE)

( * ) Notice: Subject to any disclaimer, the term of this patent is extended or adjusted under 35 U.S.C. 154(b) by 58 days.

(21) Appl. No.: 13/609,396

(22) Filed: Sep. 11, 2012

(65) Prior Publication Data

US 2013/0243358 A1 Sep. 19, 2013

(30) Foreign Application Priority Data

Sep. 16, 2011 (DE) .......................... 10 2011 082 809

(51) Int. Cl.
| | | |
|---|---|---|
| F16C 33/46 | (2006.01) | |
| F16C 33/30 | (2006.01) | |
| B25B 27/00 | (2006.01) | |
| B25B 7/00 | (2006.01) | |
| F16C 33/50 | (2006.01) | |

(52) U.S. Cl.
CPC ............. *F16C 33/30* (2013.01); *B25B 27/0035* (2013.01); *F16C 2360/20* (2013.01); *F16C 2226/74* (2013.01); *B25B 7/00* (2013.01); *F16C 2240/30* (2013.01); *F16C 33/504* (2013.01); *F16C 33/4623* (2013.01); *F16C 2226/76* (2013.01)
USPC .......................................... 384/573; 384/577

(58) Field of Classification Search
USPC .................................................. 384/573, 577
See application file for complete search history.

(56) References Cited

U.S. PATENT DOCUMENTS

| | | | |
|---|---|---|---|
| 3,399,008 A | | 8/1968 | Farrell et al. |
| 4,239,304 A | * | 12/1980 | Wakunami .................... 384/573 |
| 4,397,507 A | | 8/1983 | Kraus et al. |
| 4,472,007 A | * | 9/1984 | De Vito .......................... 384/572 |
| 4,865,473 A | * | 9/1989 | De Vito .......................... 384/572 |
| 5,178,474 A | * | 1/1993 | Muntnich et al. ............. 384/577 |
| 5,473,804 A | | 12/1995 | Rush |
| 6,261,005 B1 | * | 7/2001 | Winkler et al. ............... 384/577 |
| 6,406,190 B1 | * | 6/2002 | Yoon .............................. 384/572 |
| 6,582,131 B2 | | 6/2003 | Rossner |
| 6,835,000 B2 | * | 12/2004 | Hiramatsu et al. ............ 384/523 |
| 6,839,949 B1 | | 1/2005 | Miknich |
| 7,258,492 B2 | * | 8/2007 | Yoon .............................. 384/523 |
| 8,057,105 B2 | * | 11/2011 | Earthrowl et al. ............. 384/577 |
| 2003/0000346 A1 | | 1/2003 | Scott |

FOREIGN PATENT DOCUMENTS

| | | |
|---|---|---|
| DE | 4222185 A1 | 1/1994 |
| DE | 10360985 A1 | 7/2004 |

* cited by examiner

*Primary Examiner* — Thomas R. Hannon
(74) *Attorney, Agent, or Firm* — Bryan Peckjian; SKF USA Inc. Patent Department

(57) ABSTRACT

A bearing cage (10) for a rolling-element bearing is split in the circumferential direction along at least one cutting line (11-1; 11-2) between a first and a second bearing cage section (12-1; 12-2). A projection (14) and a corresponding opening (15) are respectively formed on opposing bordering surfaces (13-1; 13-2) of the cutting line between the first and second bearing cage sections, and are configured to fix the bordering surfaces to each other in three directions upon meshing of the projection with the opening. A main axis (17-1; 17-2) of projection and opening extends at an angle (α) oblique to the rotational axis (16) of the bearing cage.

16 Claims, 10 Drawing Sheets

SPLIT BEARING CAGE

CROSS-REFERENCE

This application claims priority to German patent application no. 10 2011 082 809.5 filed on Sep. 16, 2011, the contents of which are fully incorporated herein by reference.

TECHNICAL FIELD

The present invention relates to a split bearing cage, e.g., for rolling-element bearings, and to the production of such a bearing cage, as well as to a tool that can be used in the production thereof.

BACKGROUND

Bearing cages for rolling-element bearings are generally comprised of two axially-spaced-apart side rings. A plurality of bridges that connect the side rings and are disposed one behind the other in a circumferential direction of the bearing cage. Each pair of bridges forms a pocket for accommodating and guiding a rolling element. A bearing cage holds the rolling elements spaced apart relative to each other, thereby preventing direct contact between neighboring rolling elements and thus reducing friction and heat generation in the bearing. The bearing cage also ensures a uniform distribution of the rolling elements around the entire circumference of the cage or rolling-element bearing and thus enables a uniform load distribution as well as a quiet and smooth running of the bearing.

Bearing cages are heavily stressed in operation through frictional, strain, and inertial forces. Therefore, they are generally constructed as one piece. Rolling-element bearing cages typically comprise pressed cages or solid cages. Pressed cages for rolling-element bearings are usually manufactured from sheet steel, in some cases also from sheet brass. Solid cages for rolling-element bearings can be manufactured for example from brass, steel, aluminum, polymers, or phenolic resin.

To develop more efficient internal combustion engines, it has been investigated to replace slide bearings, which have been used for crankshafts and piston or connecting rods, with rolling-element bearings, since significant friction reductions can be achieved in this way. However since crankshafts are in principle formed with a 90° offset, there are two possible ways to mount rolling-element bearings thereon. First, if the crankshaft is built from individual parts, the bearings can be mounted axially. Second, the bearings (and specifically the bearing rings and cage) can be split radially along a plane and mounted over the shaft journals. Since the construction of crankshafts from individual parts is generally very complicated and associated with high costs, under normal circumstances it is necessary to develop and deliver divided rolling-element bearings having cages that are also divided.

Both engines for use in racing and aircraft engines are known in the art in which rolling-element bearings have been used. From these cases, findings have been made that the forces occurring, in particular in piston rod bearing applications, necessitate a one-piece cage construction. This has resulted in the requirement to construct radially divided cages, which after assembly can be connected by "locks", in order to fulfill their function as one-piece cages.

Divided or split roller-bearing cages have a through-slot at a cutting or parting line in the circumferential direction. The respective ends of the cage or side ring that border the cutting line are formed as bridges (circumferential bridges), which have projections and openings corresponding to one another, in order to fix or couple the cage ends to each other, for example using a snap-fit connection. Such split rolling-element bearing cages, in which a "lock" or a "latch" attached to the cage ends secures or fixes the cage ends, can be used in many ways, such as for example for the bearing of balance shafts or for the bearing of gears on shafts in motor vehicles having a manual transmission.

A variety of embodiments for a cage connection or a cage lock are known from the literature and from the prior art. These embodiments have up to now mainly been developed for applications in automobile transmissions and primarily to facilitate installation. In these applications, however, the forces occurring are relatively small, i.e. after assembly the cage locks are only lightly loaded. Also elastic cages, e.g. made from appropriate polymers, are primarily used with only one point of connection, which is bent open for installation and subsequently connected again by the lock. As a result, the requirements with respect to positioning and force support are substantially less than in newer applications in internal-combustion engines.

SUMMARY

It is therefore an object of the present teachings to provide improved divided or split bearing cages, and to provide an improved concept for a divided or split bearing cage as well as for its manufacture.

According to one aspect of the present teachings, it has been found that a secure positioning or immobilization (fixing) in three axes and/or directions of two ends, which are separated by a cutting line, of a first and a second bearing cage section can be achieved using at least one pair of mutually-opposing projections and openings. The three axes are preferably each perpendicular to each other, e.g., radial, tangential, and axial directions of the bearing cage. A secure and large-force-supporting connection of the bearing cage sections or bearing cage halves, as is needed for example in piston- or connecting-rod applications, is achieved in each case because both a main axis and a projection formed on the cutting line as well as the corresponding opening extend obliquely to the rotational axis of the bearing cage. In other words, the projection and the corresponding opening extend along the bordering surfaces of the cutting line at an angle oblique to the rotational axis at least in one section thereof.

In the following, the "main axis" is understood to mean the axis along which a projection or an opening in a bordering surface of the cutting line at least substantially extends. An "angle oblique to the rotational axis of the bearing cage" means an angle different from 0° or multiples of 90°, e.g., the angle $\alpha$ is selected such that $0° < \alpha < 90°$.

In another aspect of the present teachings, a bearing cage for a rolling-element bearing is disclosed, wherein the bearing cage is split or divided in the circumferential direction at or along at least one cutting line between a first and a second bearing cage section. At least one pair comprising a projection and a corresponding opening is formed in or on bordering surfaces of the cutting line facing towards each other and between the first and the second bearing cage section, in order to fix the bordering surfaces to each other in three directions (radial, tangential, axial) through the meshing or engagement of the projection and opening. That is, the projection and the corresponding opening, which in the following are also referred to as connecting elements, are formed to achieve a secure positioning in all three directions, which are preferably mutually-perpendicular. The main axes of the projection formed on the bordering surface of the cutting line and the corresponding opening each extend obliquely to the rotational axis of the bearing cage. In other words, the connecting elements, i.e. the projection and the corresponding opening, may be designed to extend conically with respect to a radial sectional plane of the cage. A secure and durable positioning of the divided bearing cage sections with respect to all three axes (axial, tangential, and radial) can be achieved through projections and openings that extend obliquely or conically at least in one section.

The projection formed on the bordering surface of the cutting line and the corresponding opening are, as viewed from the tangential direction (circumferential direction) of the bearing cage, formed opposite to one another on or in the bordering surfaces of cage sections which correspond to one another, so that upon joining the bearing cage sections in the circumferential direction, the projection can be inserted into the corresponding opening.

To additionally achieve a connecting force that is as large as possible between the bearing cage sections to be joined, the connecting elements (i.e. projection and opening) can be formed as elements having undercuts. Such a connection can be designed with connecting elements similar to a tongue and groove, or cams, however with additional, narrower extending undercuts behind their head areas, which are covered with each other through elastic deformation in small overlap regions. That is, according to certain exemplary embodiments, the projection formed on a bordering surface of the cutting line can have a cross-section that is undercut and substantially semicircular or circular in a plane perpendicular to its main axis that extends obliquely in at least one section. Accordingly, the opening corresponding to the projection can also have a substantially semicircular or circular cross-section in a plane perpendicular to its (obliquely extending) main axis, which cross-section matches, corresponds to or is complementary to the above-mentioned cross-section that is undercut and substantially semicircular or circular.

A secure and durable connection of the bearing cage sections can be ensured through such connecting elements formed with undercuts. In fact, such a connection can also support large forces occurring in crankshaft and piston rod applications. Furthermore, the bearing cage sections can be connected relatively easily using the connecting elements (projection, opening) that are based on the tongue-and-groove principle using a snap-fit connection, which, due to the undercuts, however can only be released again with relative difficulty. As will be described further below, in one additional exemplary embodiment of the present teachings, a suitable manual tool for connecting or joining the bearing cage sections is disclosed.

According to another exemplary embodiment, the projection may be a spring-like or spring-type element, which protrudes from a radial sectional plane of the divided bearing cage. In some exemplary embodiments, the obliquely extending projection can extend nearly over the entire axial (i.e. in the direction of the cage rotational axis) width of the cage, and thus can have a diameter that continually varies over the width (relative to the rotational axis of the cage).

Each projection can have a circular-segment-shaped cross-section in a plane perpendicular to its main axis, wherein a connection to the cage sectional plane or cut surface has a small radial extension as the largest radial diameter of the circular-segment-shaped projection, and thereby forms the undercut. Therefore, the corresponding opening can be considered to be a groove-like or groove-type element, which has a negative, inverse or complementary shape relative to the above-described spring-like projection and extends into the cage sectional plane or into the bordering surface of the cutting line. The radial and tangential dimensions of the opening are matched or correspond to the dimensions of the corresponding projection, in order to ensure a secure connection of the two bearing cage sections upon meshing or engaging (e.g., snap-fitting) the projection and opening with a slight overlap (or excess).

The angle $\alpha$ between the respective main axes of the connecting elements and the bearing cage rotational axis is preferably greater than 0° and less than 45°, more preferably less than 10° and even more preferably in a range from 1° to 5°. At angles less than 1°, a secure positioning may no longer be ensured. For width-thickness ratios common for rolling-element bearing cages, larger angles will no longer likely take advantage of the axial width of the cage, and are therefore rather unfavorable with respect to material efficiency. As a rule of thumb, the angle $\alpha$ can be selected so that each projection or opening extends diagonally or at least substantially diagonally from an upper corner of the radially extending bordering surface to an axially- and radially-opposite corner of the bordering surface. With common width-thickness ratios of rolling-element bearing cages, an angle of approximately 1° to approximately 5° thus results.

The respective dimensions of the connecting elements—i.e. the projection and opening—depend primarily on available space on the bordering surface of the cutting line, and therefore also on the radial cage thickness. According to some exemplary embodiments, the projection and the corresponding opening extend in a direction perpendicular to their respective main axis in a range from 0.25 to 0.4 times the bearing cage thickness. That is, their thickness corresponds to 0.25 to 0.4 times the radial bearing cage thickness.

In certain exemplary embodiments, the projection and the corresponding opening can extend substantially over the entire axial width of the bearing cage. This makes possible, above all, a simpler manufacturing and a simpler or uncomplicated assembly. Since the connecting elements extend obliquely to the rotational axis, the bearing cage halves or bearing cage sections cannot be displaced in an axial and/or radial direction. A tangential separation of the bearing cage sections is prevented by the undercut design of the obliquely extending projection and its corresponding opening.

Preferably the connecting elements—i.e. projection and opening—are disposed on the bordering surfaces of the divided bearing cage sections such that the ends of the projection and opening each do not coincide directly with radial ends of the bearing cage sections. That is, starting from any point of the projection or the opening, a minimum radial distance to a radially-outer or radially-inner end of the bearing cage is ensured. In certain exemplary embodiments, the minimum radial extension of a bordering surface from the projection or the opening out to a radial end of the bordering surface may preferably fall in the range of 0.2 mm to 1 mm. This minimum radial wall thickness inwardly or outwardly adjacent to a connecting element is generally dependent on the cage material used. For steel and/or titanium alloys, a radial wall thickness of at least 0.4 mm should be ensured. For aluminum alloys, at least 0.6 mm should be provided, whereas for polymers, such as for example polyetheretherketone (PEEK), a minimum radial wall thickness of 0.8 mm can be advantageous.

To obtain a connection in the axial and/or radial direction that is without play, the circular-segment- or oval-segment-shaped cross-section of the spring-like projection can be larger than or at least equal to the cross-section of the groove-like opening, especially in the radial direction (normal direction). In order to ensure an elastic connection between the projection and opening, the projection can be split or slotted in the middle along its main axis parallel to the cone angle α. That is, in order to allow an elastic deformation of the projection during assembly and/or disassembly of the divided bearing cage, the projection can be split or slotted along its main axis, which extends obliquely to the rotational axis.

In some exemplary embodiments, the slot formed along the main axis extends, as viewed in the tangential direction, farther or deeper than the projection itself. This means that the slot extends in the tangential direction from one of the ends of the projection into the bearing cage section tangentially through the projection into the body of the bearing cage section. Since the tangential extension of the slot is greater than the tangential extension of the projection, an optimal elasticity of the projection can be achieved. According to some exemplary embodiments, the width of the slot perpendicular to the main axis of the projection (which main axis is oblique to the rotational axis), i.e. in the radial direction ±α, can fall in a range of 0.2 times up to 0.3 times the radial extension of the projection. That is, the width of the slot can for example be approximately one-fourth of the radial extension of the elastic element or the projection.

Alternatively to the circular-segment- or oval-segment-shaped cross-sections of the connecting elements (projection, opening), other geometric forms are possible which are based on rectangular based shapes. So-called dovetail shapes (prismatic or trapezoidal groove and spring) merit special mention here, as they also have high reliability. These can have rounded edges for easier joining of the bearing cage sections in the circumferential direction, as long as they provide undercuts in the tangential direction, in order to be able to realize appropriately high or large connecting forces after the joining of the cage halves.

While in some exemplary embodiments the cage connecting elements that extend obliquely to the cage rotational axis can be formed to simply extend only rectilinearly, other exemplary embodiments are also conceivable which further develop this base shape of the "conical" spring-groove connection.

Thus for example a V-shape of the connecting elements, i.e. projection and opening, can be considered. Instead of the opening obliquely extending rectilinearly, in this case a projection-opening arrangement has a V-shape, wherein the tip of the "V" is located approximately in the middle of the axial cage width. The main axes of the projection and the corresponding opening extend at angles of +α and −α relative to the rotational axis. The tip of the "V" can be oriented radially outward or radially inward.

Furthermore a so-called double-V-shape is conceivable, wherein the projections and openings are disposed in such a way that, in addition to the V-shape, a mirrored V-shape of the connecting elements results in the bordering surfaces of the connecting line. Here the tips of the mirrored "V" point in opposing radial directions. The double-V-shape is however only possible or useful with a sufficient radial extension (thickness) of the bearing cage.

An alternative to the double-V-shape is an X-shaped arrangement of the connecting elements, since less radial space is needed here than with the double-V-shape. However, an X-shaped arrangement of the connecting elements in the bordering surfaces of the connecting line is more difficult to manufacture in certain circumstances. The double-V and X-shaped variants are advantageous in particular for injection-molded bearing cages made from polymers, such as for example polyamide or PEEK.

Depending on the quantities and/or materials, certain manufacturing methods are preferred. For small quantities of metal bearing cages, a manufacturing method such as wire electric discharge machining is recommended, which allows for flexible and precise manufacturing. For larger quantities, mechanical methods, such as for example milling, are suitable for all materials. For very large quantities, such as for example are common in the automobile industry, injection-molding methods are recommended for plastics or MIM (metal injection molding; combined injection molding and sintering method) for all appropriate materials.

Since the required retaining forces between connected bearing cage sections or halves can be very high for some applications, another exemplary embodiment of the present teachings provides a tool for assembling or mounting the divided bearing cage. To prevent damage and ensure a secure assembly, the tool preferably encloses both divided cage halves simultaneously and uniformly, i.e. the inner diameter of the parts of the tool contacting the cage halves preferably corresponds to the outer diameter of the bearing cage. The part of the tool contacting and embracing the cage halves preferably only contacts the axially-spaced-apart side rings of the bearing cage halves, in order to prevent damage to the rolling elements guided between the side rings while the split bearing cage is being assembled.

Therefore, according to another embodiments, a tool for assembling or mounting a divided bearing cage preferably includes two bearing cage section shells matched to the bearing cage sections of the bearing cage, wherein each shell has an inner diameter matched to the outer diameter of the bearing cage section, and the shells are configured to apply pressure to the side rings of the divided bearing cage during assembly, without making contact with the rolling elements that are guided by the bearing cage. Furthermore in order to be able to bring together the divided bearing cage sections, the tool preferably comprises an actuating element for supplying the necessary force to join the two bearing cage section shells.

According to a further exemplary embodiment, the bearing cage section shells each have two side-ring shell elements disposed at an axial distance from the bearing cage side rings; the side-ring shell elements can bring together the bearing cage side rings during assembly. Preferably, the actuation of the tool causes or relies on a lever effect, in order to enable an easier assembly of the divided bearing cage. For this purpose the actuator element can be formed to guide the bearing cage section shells together by using the lever effect. The actuating element can comprise for example two levers connected at a pivot point, which can be pressed together during assembly, similar to a pair of pliers. The projections of the bearing cage sections can be snapped into the openings of the bearing cage sections through the lever effect applied by the tool.

In certain exemplary embodiments of the present teachings, a secure and reliable connection of divided bearing cage sections is made possible, which ensures a positioning in all three axial directions and holds the bearing cage sections together in the circumferential direction, wherein the retaining forces can be set by the overlappings (excesses) or dimensions of the projection and opening, according to application-specific requirements and depending on the material used. Through these possibilities, exemplary embodiments of the present teachings can be used in particular, e.g., for bearing cages of rolling-element bearings in internal combustion engines and in particular in piston or connecting rod applications.

Further objects, embodiments, advantages and designs of the present teachings will be explained in the following, or will become apparent, with the assistance of the exemplary embodiments and the appended Figures.

DETAILED DESCRIPTION OF THE INVENTION

Figure 1:
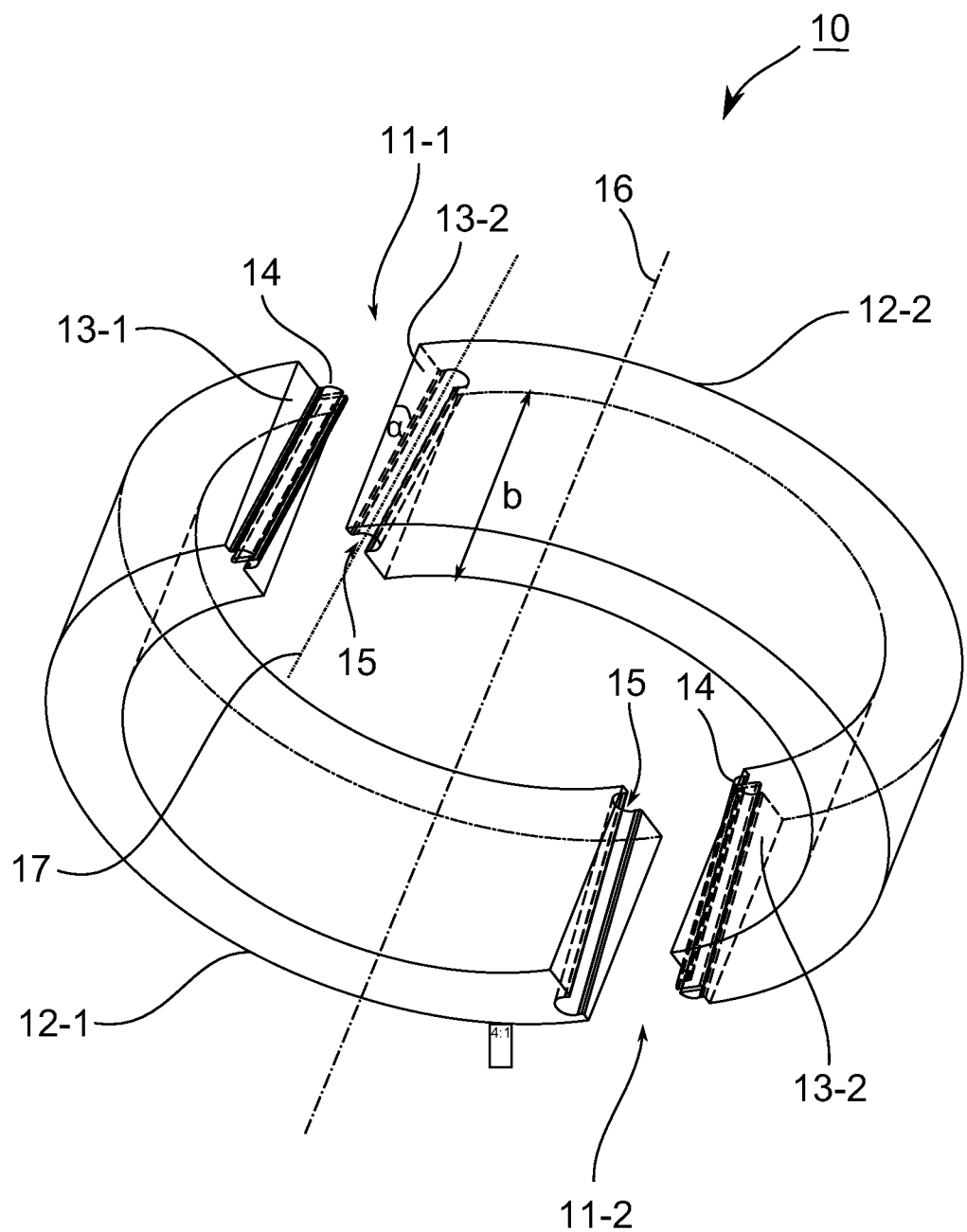
FIG. 1 shows a three-dimensional illustration of a representative split or divided bearing cage in the open state.

FIG. 1 shows a three-dimensional schematic diagram of an exemplary embodiment of a divided or split bearing cage 10 for guiding rolling elements of a rolling-element bearing. In each of the Figures, the two ring halves of the split bearing cage are shown as solid parts for simplicity of illustration. However, it will be understood that each of the ring halves (sections) comprises two axially-spaced-apart side ring halves. A plurality of bridges connect the side ring halves and are disposed one behind the other in a circumferential direction of the bearing cage. Each pair of adjacent bridges forms a pocket for accommodating and guiding a rolling element. Thus, when assembled, the split bearing cage will hold and guide a plurality of rolling elements (e.g., balls, cylinders, cones, barrels, spherical elements, etc.) spaced apart relative to each other in the circumferential direction of the bearing.

The bearing cage 10 is split or divided in the circumferential or tangential direction, for example at two cutting lines 11-1, 11-2 between a first bearing cage section 12-1 and a second bearing cage section 12-2. Between the first and the second bearing cage sections 12-1, 12-2, a pair comprising a projection 14 and a corresponding opening 15 opposite thereto (in the circumferential direction) is formed on mutually-opposing bordering surfaces 13-1, 13-2 of the cutting lines 11-1, 11-2, in order to fix or secure the bordering surfaces 13-1, 13-2 to each other in three directions (axial, radial and tangential) upon meshing or engaging of projection 14 and its corresponding opening 15. The projections 14 and the corresponding openings 15 together form a so-called bearing cage lock. The main axes 17 of the projections 14 and the openings 15 each extend obliquely to the rotational axis 16 of the divided bearing cage 10 or obliquely to outer edges of the bordering surfaces. The outer edges extend axially and radially border the bordering surfaces 13-1, 13-2. This is particularly clear from the two-dimensional representation in FIGS. 5a and 5b.

Figure 5A:
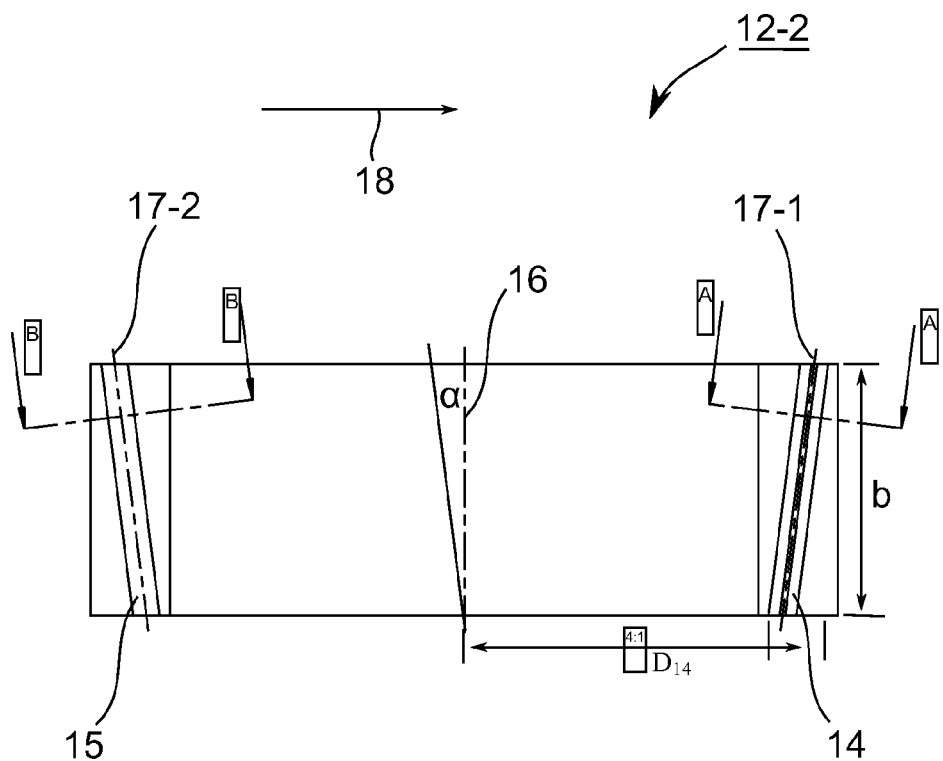
FIGS. 5a and 5b respectively show a side view and a plan view of a connecting element extending along a cutting plane obliquely to the cage rotational axis.
Figure 5B:
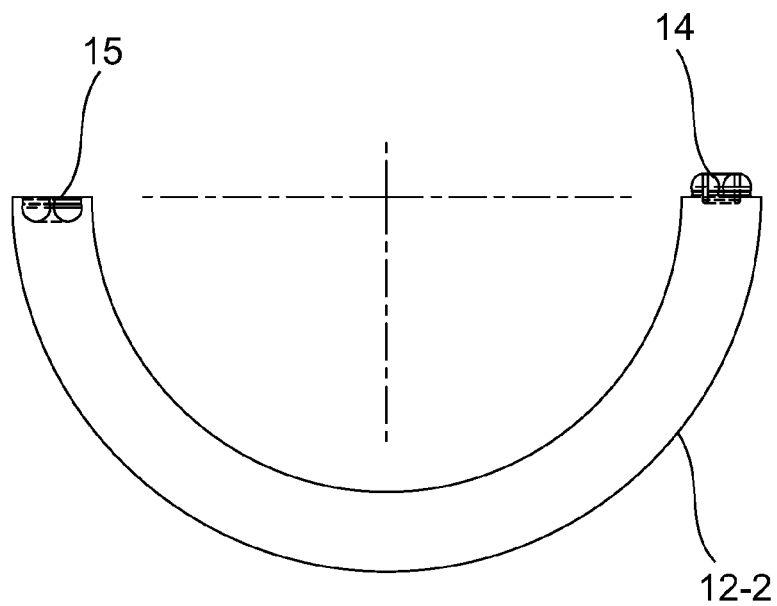

FIG. 5a shows a two-dimensional side view of the bearing cage halves 12-1 and 12-2 shown three-dimensionally in FIG. 1, whereas FIG. 5b shows a plan view of these bearing cage halves.

In FIG. 5a the main axes 17-1, 17-2 of the connecting elements 14, 15 are shown. The main axes extend obliquely at an angle α to the bearing cage rotational axis 16 for a groove-type opening or depression 15 as well as for a spring-type projection 14 of a bearing cage half. It should be noted that the opening 15 illustrated in FIG. 5a and the projection 14 opposing it in the radial direction 18 are not mutually corresponding connecting elements, which are instead located on the other bearing cage half 12-1 (not shown in FIG. 5a). Nevertheless it is clear that the spring- or cam-type projection 14 as well as the groove-type opening 15 each extend along the bordering surfaces 13-1, 13-2 of the two cutting lines 11-1, 11-2 at an angle α oblique to the rotational axis 16 of the divided bearing cage 10. An equivalent statement is that the projection 14 and/or the opening 15 in the bordering surfaces 13-1, 13-2 extend obliquely (i.e. not perpendicular) relative to the radial inner and/or outer edges of the bordering surfaces 13-1, 13-2.

In the exemplary embodiment illustrated here, the angle α between bearing cage rotational axis 16 and main axis 17-1 or 17-2 of the connecting elements 14, 15 is preferably greater than 0° and less than 10° in terms of magnitude and preferably in a range from approximately 1° to approximately 5°. At angles α less than 1°, a secure positioning or fixing of the two bearing cage sections 12-1, 12-2, in particular in the axial direction along the rotational axis 16, can no longer be ensured. For width-thickness ratios common for rolling-element bearing cages, larger angles α will no longer likely take advantage of the axial width b of the bearing cage, and are therefore more unfavorable with respect to material efficiency.

Figure 2A:
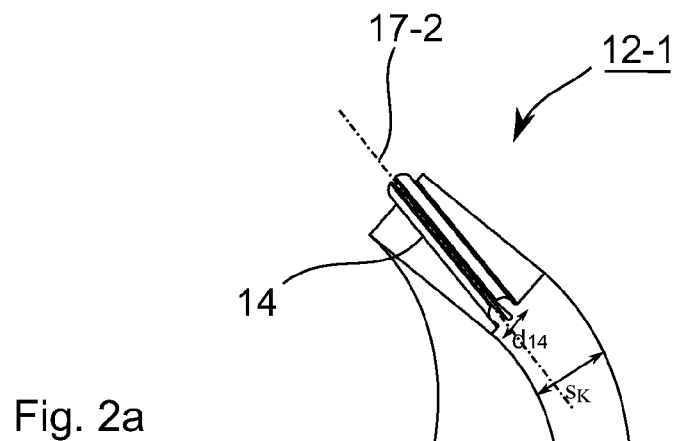
FIGS. 2a and 2b show respective three-dimensional illustrations of the two cage halves of the split bearing cage according to FIG. 1.
Figure 2B:
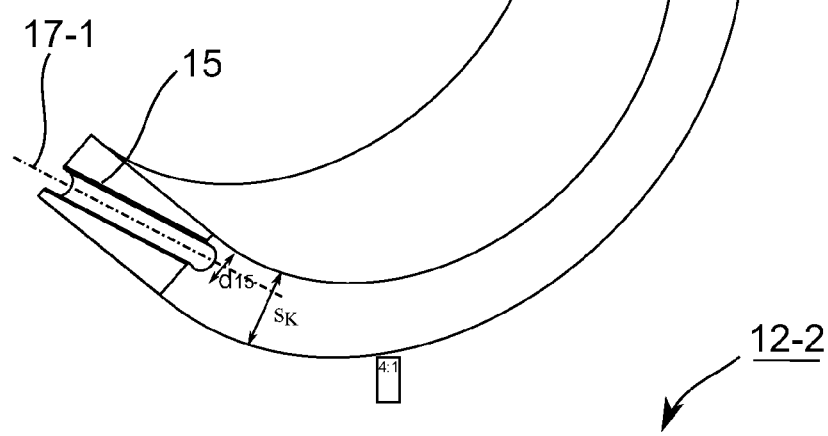
Figure 2B:
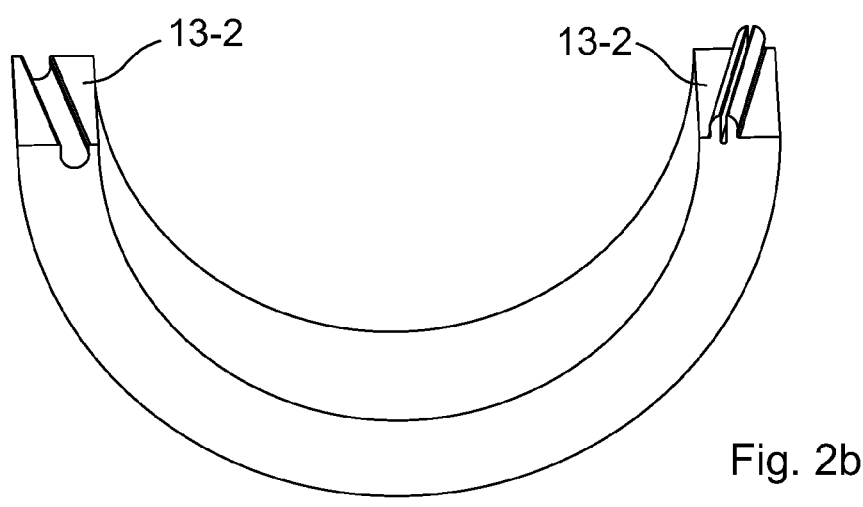

As can be better seen by referring to the illustration in FIGS. 1, 2a and 2b, the projections 14 formed on the bordering surfaces 13-1, 13-2 of the cutting lines 11-1, 11-2 and their corresponding openings 15 are formed on the bordering surfaces 13-1, 13-2 opposing each other in the circumferential direction (i.e. in the tangential direction), so that upon joining the bearing cage sections 12-1, 12-2 in the circumferential direction the projections 14 can be pushed or snapped into their corresponding openings 15. In order to achieve a connecting and retaining force between the bearing cage halves 12-1, 12-2 that is as large as possible after joining them, according to some exemplary embodiments the lock connecting elements 14, 15 corresponding to each other preferably have undercuts. This can be seen in particular from the enlarged illustrations in FIGS. 3 and 4.

Figure 3A:
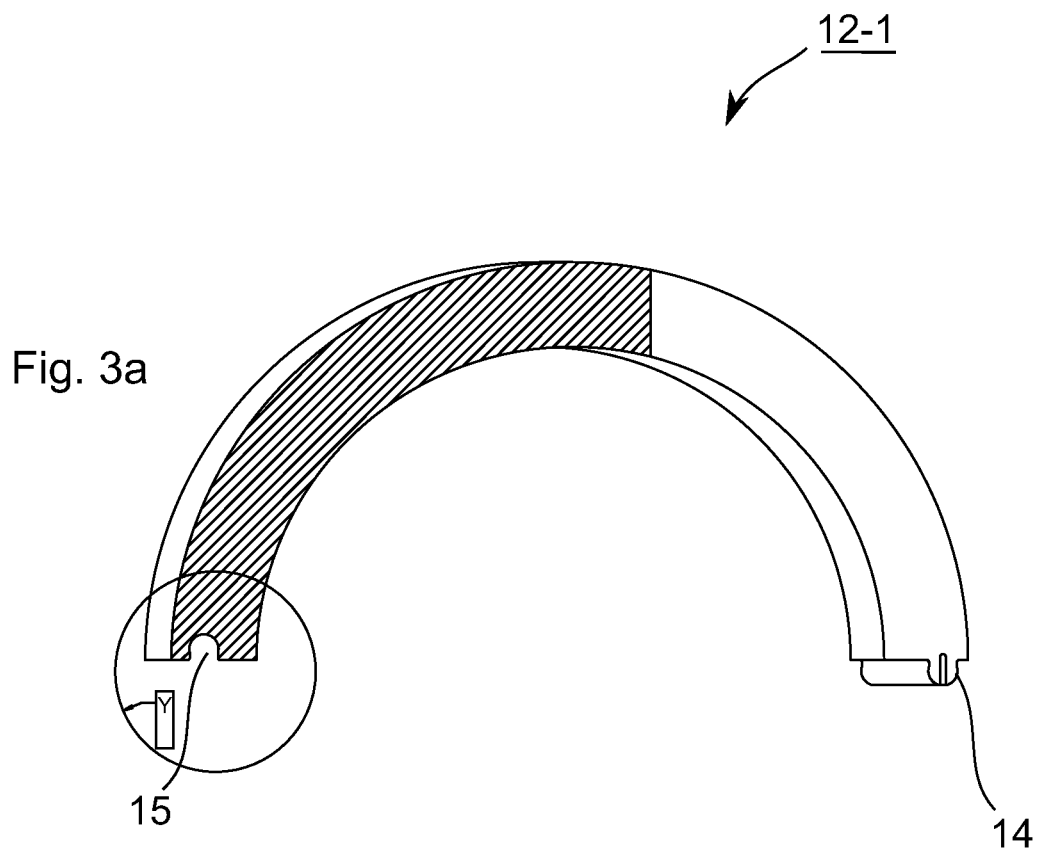
FIGS. 3a and 3b show enlarged illustrations of an opening formed in a cutting plane of the bearing cage.
Figure 3B:
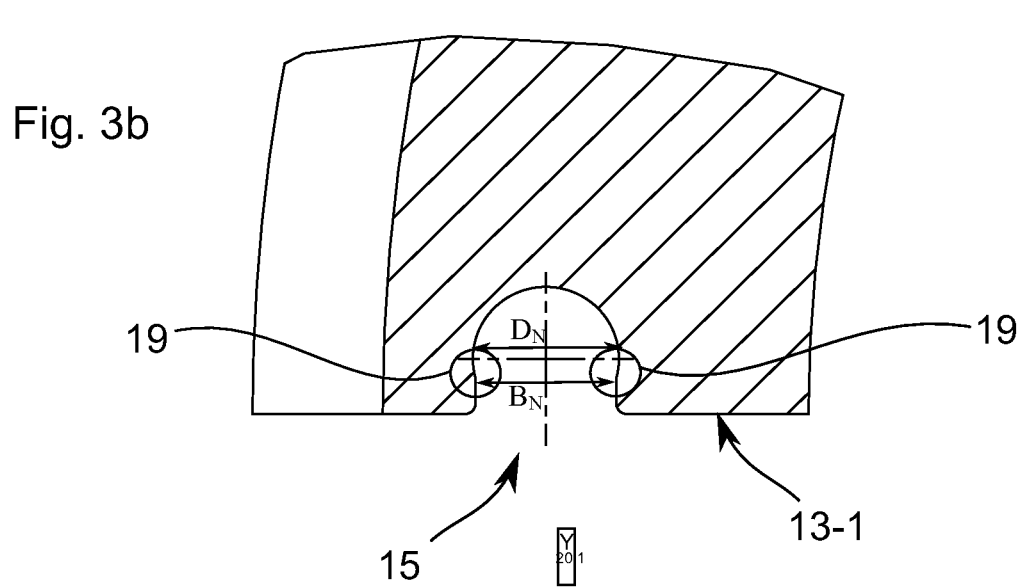
Figure 4A:
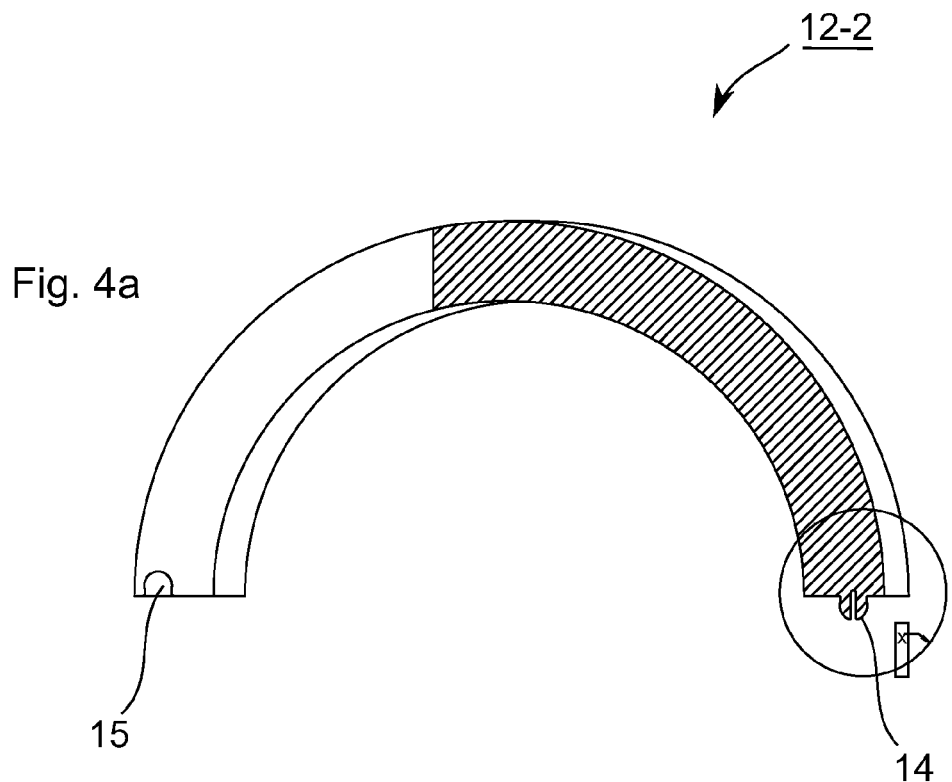
FIGS. 4a and 4b show enlarged illustrations of a slotted projection formed on a cutting plane.
Figure 4B:
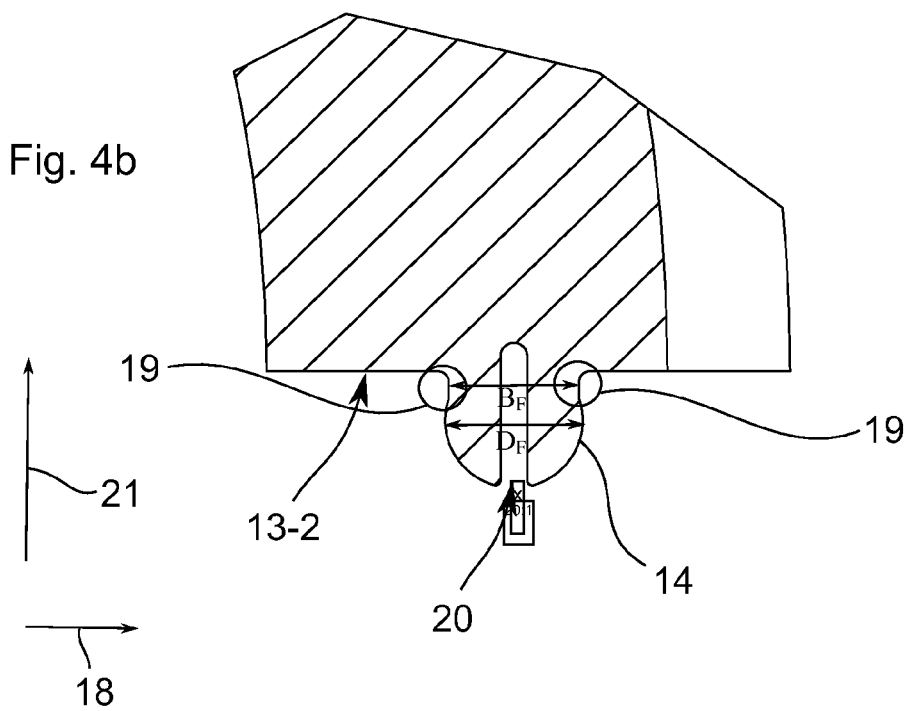

While FIGS. 3a and 3b show an enlarged representation of a groove-type opening or depression 15, FIGS. 4a and 4b show an enlarged view of a corresponding spring- or cam-type projection 14. In the exemplary embodiment shown, the projection 14 formed on a bordering surface 13-1, 13-2 of a cutting line 11-1, 11-2 has an undercut (indicated by the areas 19) and has substantially semicircular- or circular-shaped cross-section in a plane perpendicular to its main axis 17-1 or 17-2. An opening 15 corresponding to the projection 14 has a complementary or inverse, substantially semicircular- or circular-shaped cross-section in a plane perpendicular to its main axis 17-1 or 17-2, which cross-section matches or corresponds to the above-mentioned cross-section that is undercut and also substantially semicircular or circular.

The spring-like connecting element 14 thus protrudes from a radial sectional plane 13-2 of the divided bearing cage 10, and according to some exemplary embodiments, can extend in the axial direction over substantially the entire width b of the cage, and thereby have a diameter D14 that continually changes over the width b with respect to the cage rotational axis 16 (see FIG. 5a). The oblique extension of the main axes 17-1 and 17-2 of the connecting elements 14, 15 are thereby achieved by the changing diameter D14 along the axial extension of the cage 10. The spring-like projection 14 can have a circular-segment-shaped cross-section, wherein a connection to the cage sectional plane 13-2 has a smaller radial extension BF than the largest diameter DF of the circular-segment-shaped projection 14 and thereby forms the undercut 19 (see FIG. 4b).

As shown in FIG. 3b, the groove-type connecting element 15 has a negative, inverse or complementary shape relative to the above-described spring-type projection 14, and extends into the cage sectional plane or surface 13-1. In order to ensure a secure connection or fixing of the two bearing cage sections 12-1, 12-2 through a slight overlap or excess, the groove-type opening 15 is matched in its radial and tangential dimensions (BN, DN) to the dimensions (BF, DF) of the spring-type projection 14.

Other geometric dimensions of the obliquely extending connecting element 14 and opening 15 are possible and will depend primarily on the available space and also on the radial cage thickness SK.

As can be seen for example from FIGS. 2a and 2b, the obliquely extending projection 14 as well as the obliquely extending opening 15 can extend in a direction perpendicular to their respective main axis 17-1 or 17-2 in a range from 0.25 times to up to 0.4 times the radial bearing cage thickness SK. In other words, the extension d14 of the projection 14 and/or the radial extension d15 of the opening 15 in a direction perpendicular to their respective main axes 17-1 or 17-2 can amount to approximately one-third of the cage thickness SK.

A minimum remaining radial wall thickness inwardly or outwardly adjacent to the connecting element (projection 14, opening 15) can be chosen depending on the material used for the divided bearing cage 10. In certain exemplary embodiments, the minimum radial extension of a bordering surface 13-1 or 13-2 from the projection 14 or the opening 15 to a radial end of the bordering surface 13-1, 13-2 falls in a range of 0.2 mm to 1 mm. With steel and titanium alloys, the minimum remaining radial wall thickness adjacent to a connecting element should not fall below 0.4 mm. With aluminum alloys at least 0.6 mm is preferably to be chosen as the minimum radial wall thickness. With polymers, such as for example PEEK, the minimum radial wall thickness should not fall below 0.8 mm.

As is indicated in all of the figures, the spring-type projection 14 can be slotted (i.e. can have a slot 20) along its main axis 17-1 or 17-2, which is oblique to the rotational axis 16. That is, a projection 14 formed on a bordering surface 13-1 or 13-2 can be slotted along its main axis 17-1 or 17-2, in order to enable an elastic deformation of the projection 14 (in particular in a direction perpendicular to the main axis 17-1 or 17-2). As can be seen for example from FIG. 4b, the slot 20 can extend in the projection 14 deeper in the tangential direction 21 than the projection 14 itself extends in the tangential direction 21. An optimal elasticity of the elastic projection 14 in the radial direction 18 can thereby be achieved.

According to certain exemplary embodiments, the width BS of the slot 20 perpendicular to the main axis 17-1 or 17-2, i.e. in the radial direction 18 (strictly speaking in the direction perpendicular to the oblique main axis 17-1 or 17-2), can fall in a range of 0.2 times to 0.3 times the radial extension DF of the projection 14. Even more preferably, the thickness or width BS of the slot 20 is about one-fourth of the radial extension DF of the spring-type projection 14.

Figure 6A:
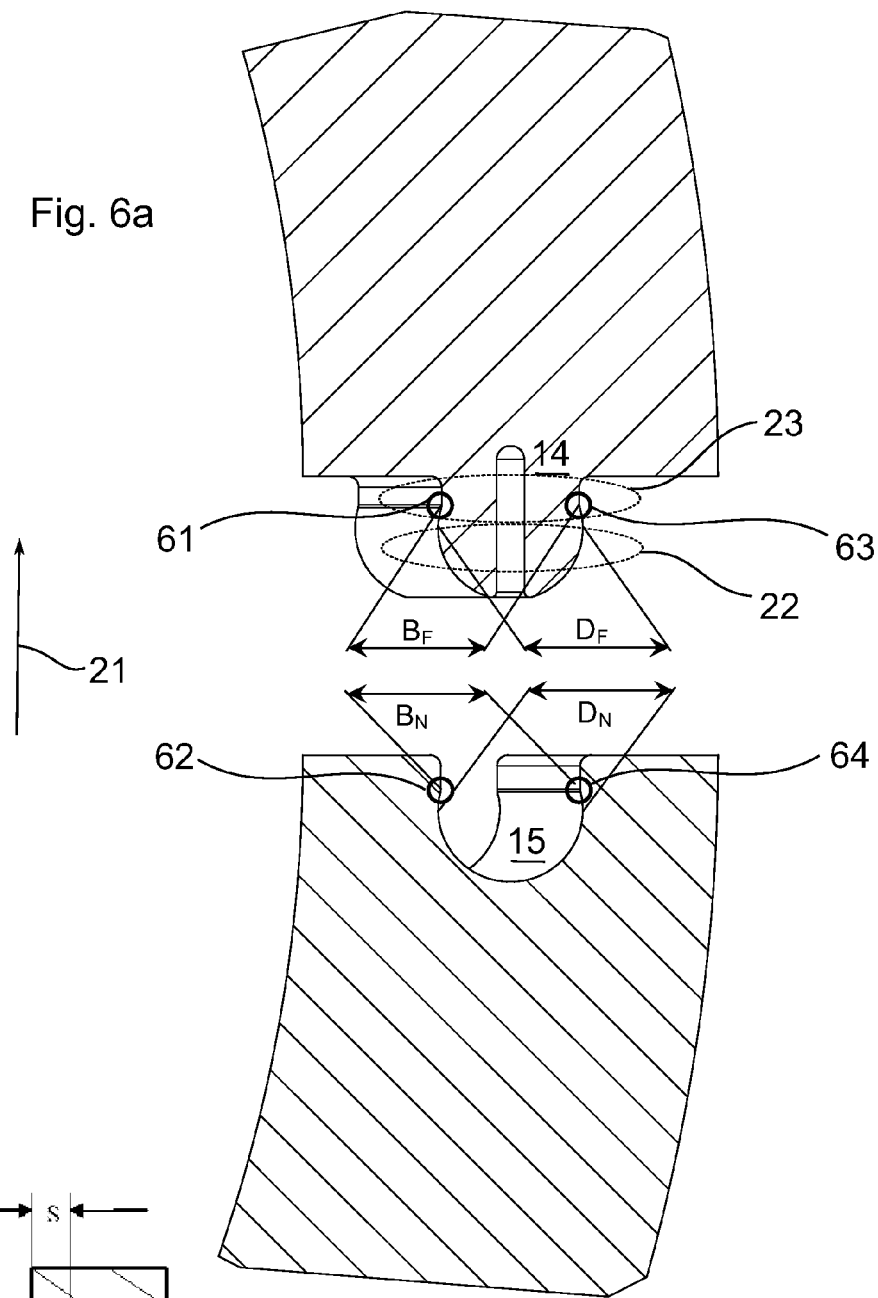
FIGS. 6a and 6b show enlarged illustrations of an undercut projection and a corresponding, opposing opening.
Figure 6B:
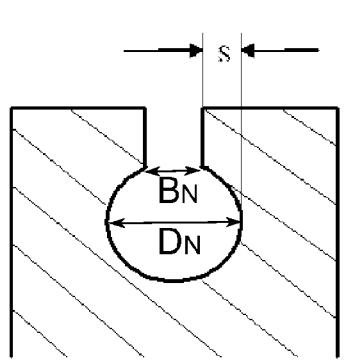

Referring to FIGS. 6a and 6b, in order to ensure a play-free fit of the connection between projection 14 and its corresponding opening 15 in the tangential direction 21, contact is ensured in the region of the points 61 to 64 in FIG. 6a for all tolerance positions of the connection between projection 14 and opening 15. To ensure this, the extension of the spring-type projection 14 in the tangential direction 21 of the tolerance position can be somewhat smaller than the corresponding dimension of the groove-type opening 15. The shape and dimensions of the two connecting elements 14, 15 should thus be established in all tolerance positions so as to ensure a contact of the two elements 14, 15 at the base area 22 of the circular-segment-shaped region in the transition to the connecting region 23 to the cage sectional plane 13-1 or 13-2.

In order to ensure this, according to some exemplary embodiments, instead of the circular-segment-shaped embodiment of projection 14 and opening 15, oval-segment-shaped cross-sections perpendicular to main axes 17-1 or 17-2 can also be chosen, wherein the large main axis thereof lies in the normal direction to the bearing cage pitch circle (i.e. perpendicular to the main axis 17-1 or 17-2). That is, in order to obtain a play-free connection in the axial and radial directions (the normal direction), the circular-segment- or oval-segment-shaped cross-section of the spring-type projection 14 can be chosen in particular to be larger or at least equal in the normal direction to the groove-shaped opening 15.

With metallic bearing cages, the undercuts 19 preferably satisfy the relationship 0.01 mm≤S≤0.05 mm, and for bearing cages made from plastic preferably 0.05 mm≤S≤0.2 mm, wherein S=(DF−BS)/2 or S=(DN−BN)/2 (see FIG. 6b).

Figure 7:
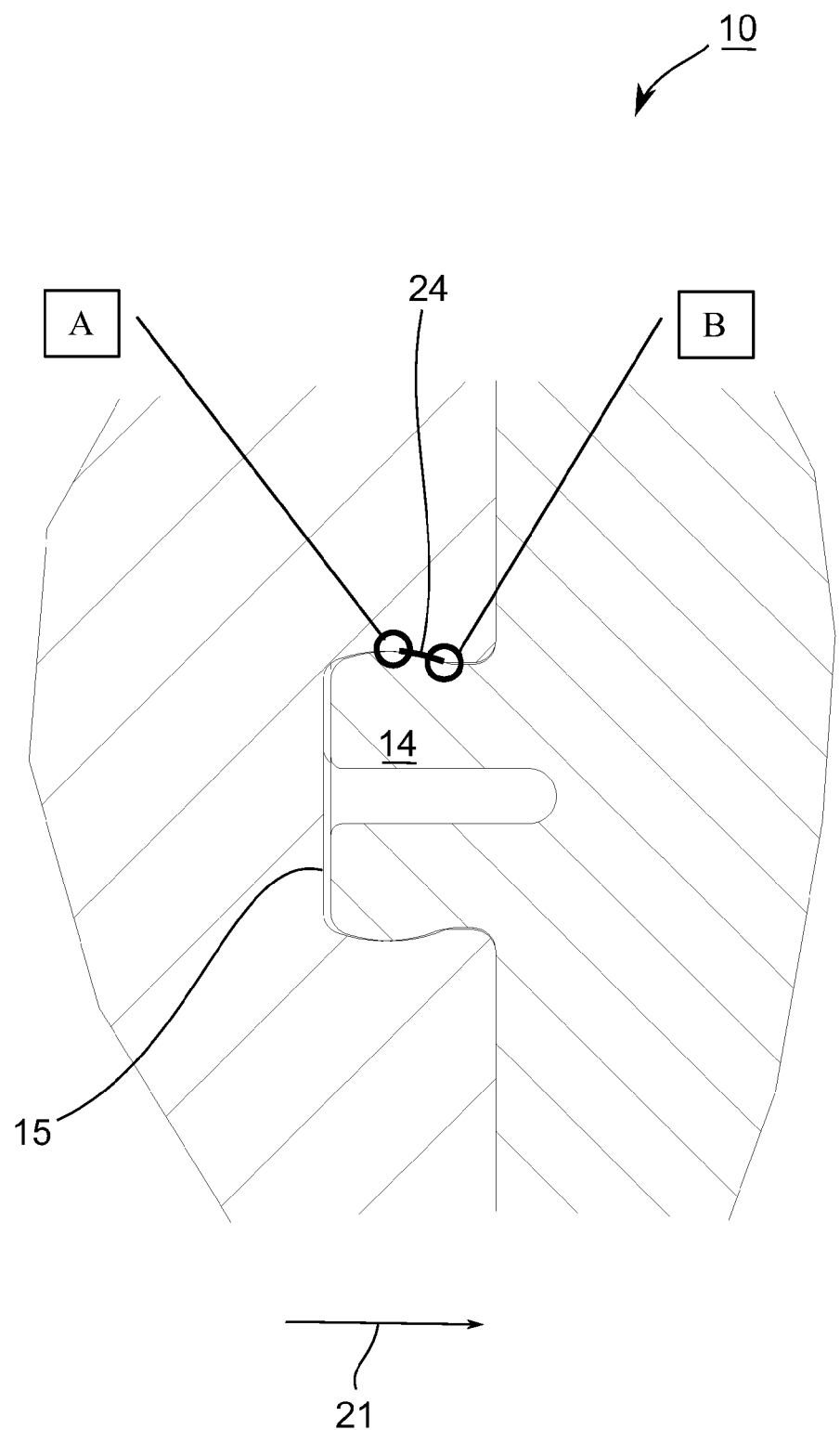
FIG. 7 shows an illustration of a projection meshed with an opening, each having a truncated, circular-segment-shaped cross-section.

Referring to FIG. 7, as alternatives to the previously-described circular-segment- or oval-segment-shaped cross-sections of the obliquely extending connecting elements 14, 15, modified shapes are also conceivable, such as for example a truncated circular-segment-shaped cross-section, since the undercuts 19 primarily support the main force in the circumferential direction. That is, a projection 14 does not necessarily need to extend in a circular-segment-shaped or oval-segment-shaped manner at its tangentially projecting end. Instead, a projection 14 can also have a bordering plane on its end which projects in the tangential direction. This bordering plane extends parallel to the bordering surfaces 13-1 and 13-2. A connecting element shape that is shortened in this way can have the advantage that it can be constructed shorter in the tangential direction, i.e. in the circumferential direction 21, and thus less space is needed for the possible number of rolling elements. A sufficient retaining force in the tangential direction is nevertheless ensured due to the undercuts 19.

For an optimized shape of the connection of the divided bearing cage 10 with regard to the retaining force, assembly and manufacturability, the region 24 of the maximum overlap should lie between the start of the undercut B and the reversal or inflection point A of the bordering curve on the projection 14, in particular for the shortened shape according to FIG. 7, but also for all other shapes having curved bordering lines of the connecting elements 14, 15. The areas in the contact region between projection 14 and opening 15, which lie outside this maximum overlap 24, preferably have only minimum contact or air. This allows an unambiguous contact region 24 to be established, which can best transmit the forces between projection 14 and opening 15. On the other hand, the remaining area serves simply for guiding and/or for securing and facilitating assembly.

Alternatively to the circular-segment- or oval-segment-shaped cross-sections of the projections 14 and openings 15 of the cage lock, which projections and openings extend obliquely relative to the axial direction, other geometries are also possible which are based on rectangular base shapes. So-called dovetail shapes, which also have high reliability, merit special mention here. These can also have rounded edges for easier joining in the circumferential direction, as long as they provide undercuts in the tangential direction, in order to be able to realize accordingly high connecting or retaining forces after the joining of the bearing cage halves 12-1, 12-2.

Although divided bearing cage sections 12-1, 12-2 having purely rectilinear connecting elements 14, 15 extending obliquely to the bearing cage rotational axis 16 have been described with reference to the Figures, according to other exemplary embodiments further developments are also conceivable which all have, however, connecting elements extending obliquely to the cage rotational axis 16 in at least one section.

Figure 9:
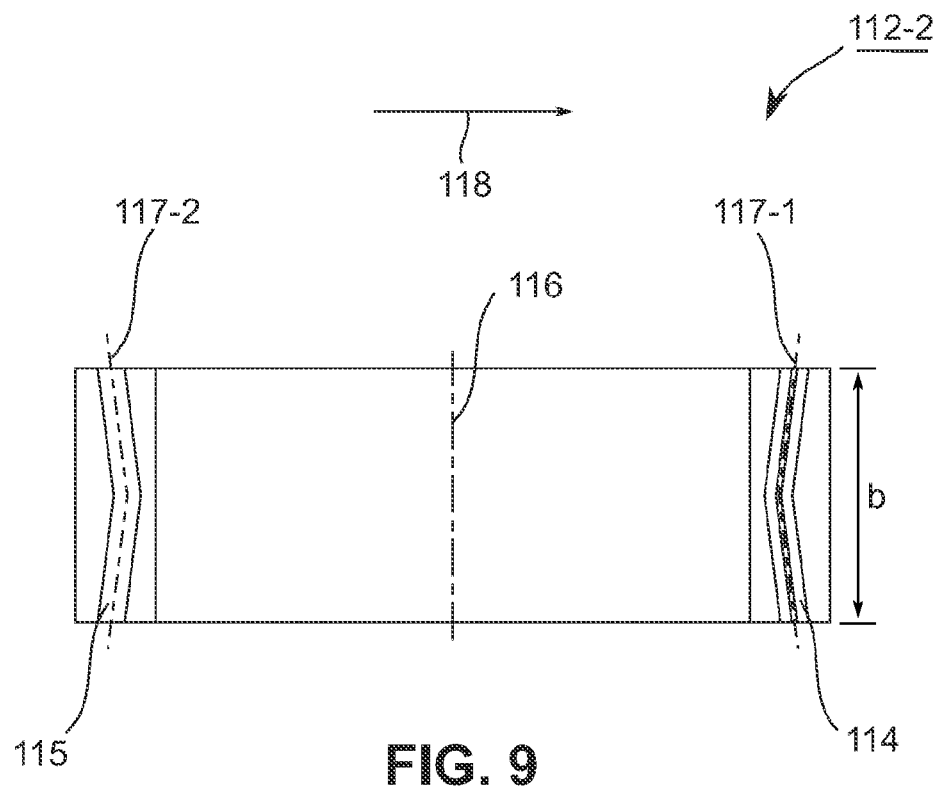
FIG. 9 shows a side view of a connecting element introducing V-shaped connecting elements.

Thus for example a V-shape of the connecting elements 114, 115, i.e. projection and opening, is illustrated in FIG. 9. Like features of the V-shaped connecting elements embodiment and the linear-shaped connecting elements embodiment are numbered the same except preceded by the numeral '1'. Instead of the purely rectilinear obliquely extending opening, here a projection-opening arrangement in a V-shape is chosen, wherein the tip of the "V" is located approximately in the middle of the axial cage width b. Here the tip of the "V" can be oriented radially outward or radially inward. With the V-shape, a connecting element has a first section which encloses an angle α with the rotational axis 16, as well as a second section which encloses an angle (180°-α) with the rotational axis 16.

Figure 10:
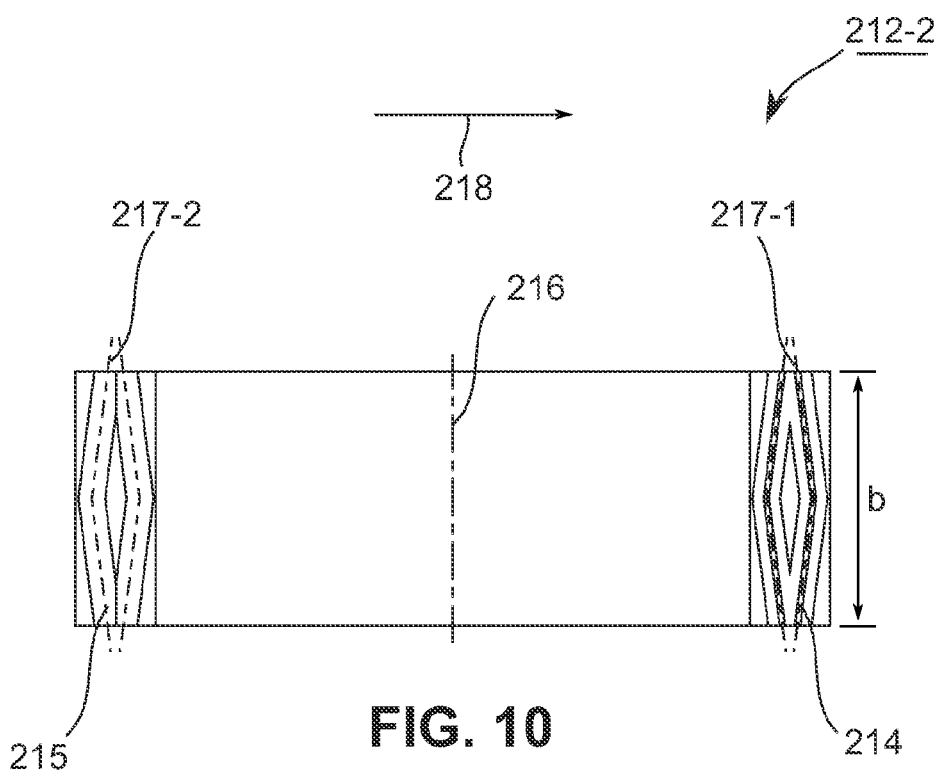
FIG. 10 shows a side view of a connecting element introducing so-called double-V-shaped connecting elements.

Furthermore a so-called double-V-shape is conceivable, wherein the projections 214 and openings 215 are each disposed in such a way that, in addition to the V-shape, a radially mirrored V-shape of the connecting elements results in the bordering surfaces of the cutting line as illustrated in FIG. 10. Like features of the double-V-shaped connecting elements embodiment and the linear-shaped connecting elements embodiment are numbered the same except preceded by the numeral '2'. Here the tips of the mirrored "V" can point in opposing radial directions. The double-V-shape is however only possible or useful with a sufficient radial extension (thickness) SK of the bearing cage.

Figure 11:
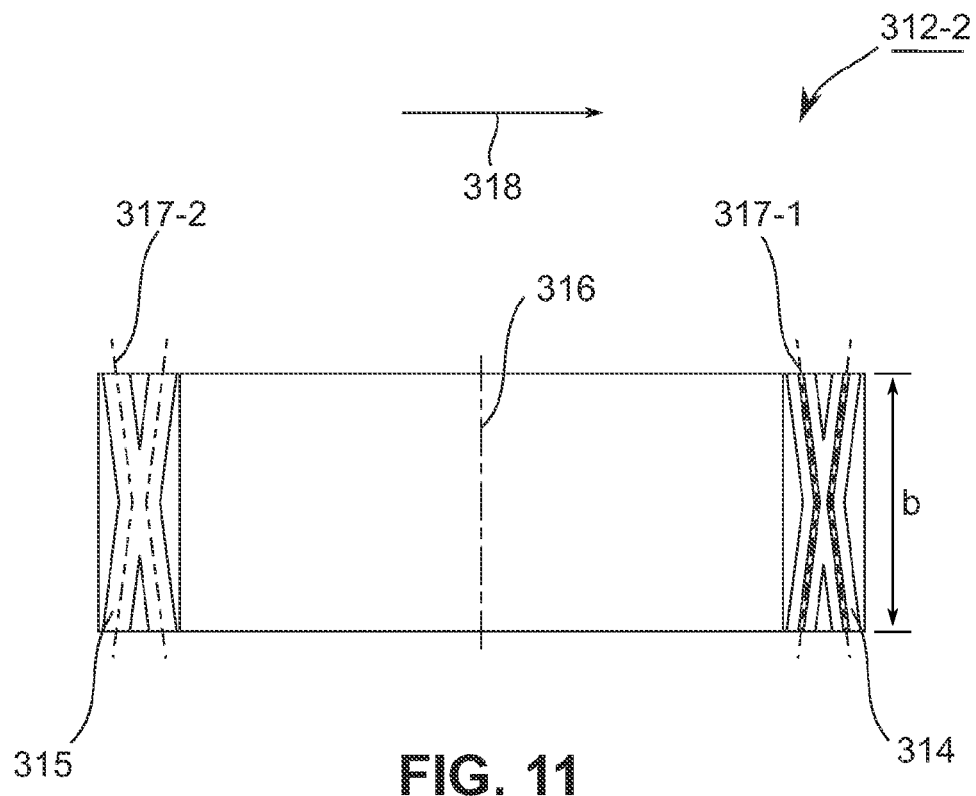
FIG. 11 shows a side view of a connecting element introducing X-shaped connecting elements.

An alternative to the double-V-shape can be seen in an X-shaped arrangement of the connecting elements 314, 315, since less radial space is needed here than with the double-V-shape is illustrated in FIG. 11. Like features of the X-shaped connecting elements embodiment and the linear-shaped connecting elements embodiment are numbered the same except preceded by the numeral '3'. However, an X-shaped arrangement of the connecting elements in the bordering surfaces 13-1, 13-2 of the connecting line is in certain circumstances more difficult to manufacture. The double-V- and double-X-shaped variants are advantageous in particular for injection-molded bearing cages made from polymers, such as for example polyamide or PEEK.

Depending on quantities and/or materials used, different manufacturing methods can be used for divided bearing cages. For small quantities of cages made from metallic materials, manufacturing methods, such as for example wire electric discharge machining, which allows flexible and precise manufacturing, come into consideration. For larger quantities, mechanical manufacturing methods, such as for example milling, are suitable for all materials of the divided bearing cage. For the largest quantities, such as for example are common in the automobile industry, injection-molding methods are recommended for plastics or MIM for all appropriate materials.

In order to increase the connecting forces between projection 14 and opening 15 upon connecting or after the joining, the possibility exists to increase the undercut 19 or overlap 24 between projection 14 and opening 15 and additionally to facilitate the assembly process, in which for example the openings 15 are locally heated. The resulting increase in installation effort can be sensible for difficult applications, such as for example piston rod bearings in internal combustion engines. Should a local heating not be possible in a given application, the two spring-type projections 14 can also be introduced into a cage half 12-1 or 12-2, and the groove-type openings 15 can be introduced into the other half. Thereby a positioning of the two bearing cage halves 12-1, 12-2 can possibly be supported with external aids prior to their assembly. The extent of the respective heating can be adjusted based on the respective application and retaining forces required. The undercuts 19 can be further increased through such measures with respect to the further above-mentioned stipulations.

Depending on the place of usage of the bearing cage 10, the retaining forces of the joined bearing cage halves 12-1, 12-2 can be very high. In some exemplary embodiments it may therefore be necessary to assist the assembly of the divided bearing cage by using a tool.

Figure 8:
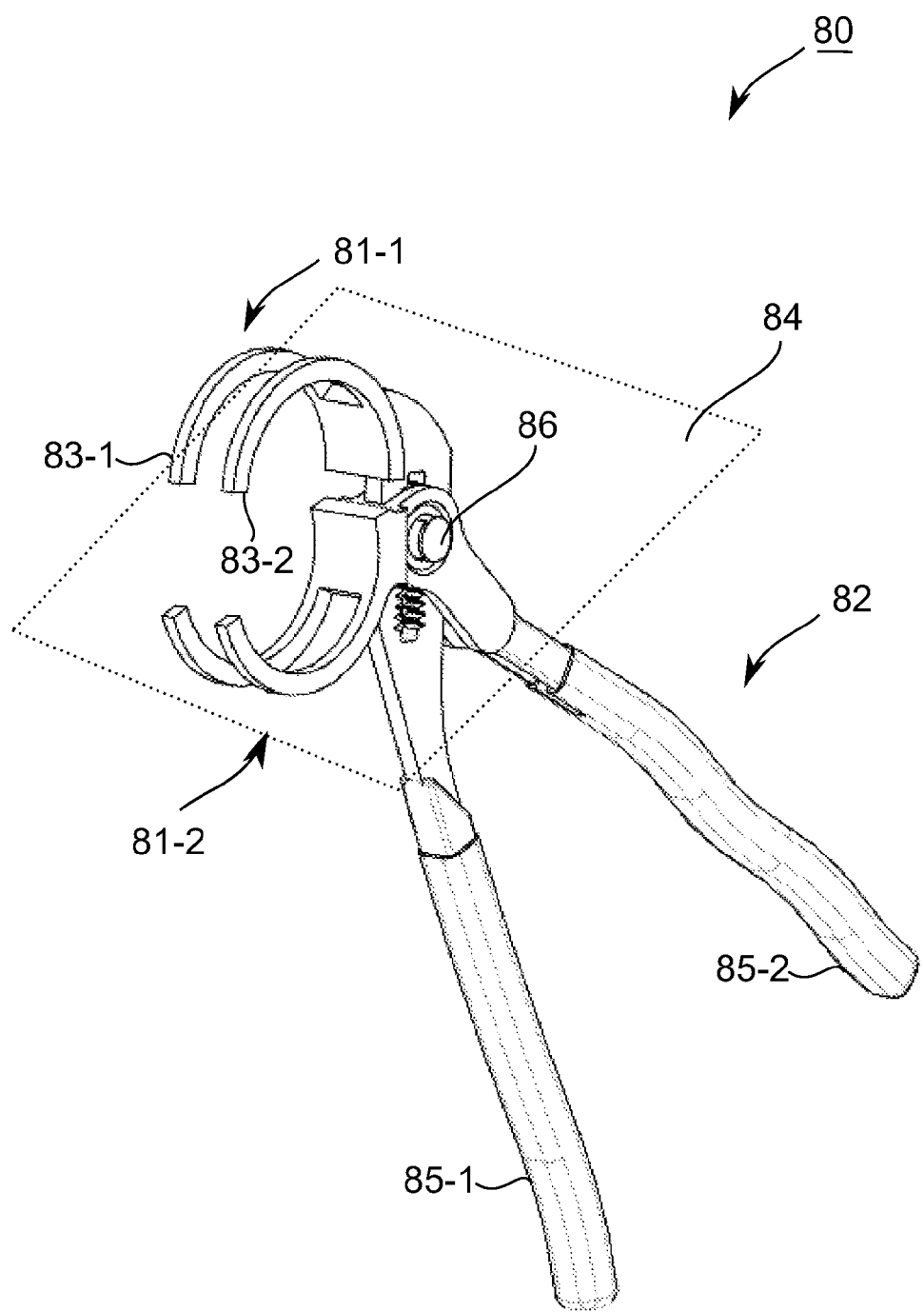
FIG. 8 shows a three-dimensional illustration of an assembly tool for a divided bearing cage.

An exemplary embodiment of such a tool for the assembly of the divided bearing cage 10 is shown in FIG. 8.

The tool 80 comprises two bearing cage section shells 81-1, 81-2 matched to the bearing cage sections 12-1 and 12-2 of the bearing cage 10, wherein each shell has an inner diameter matched to the outer diameter of the bearing cage section 12-1, 12-2, and the shells are adapted to be able to apply pressure to the side rings of the divided bearing cage 10 during assembly, without making contact with the rolling elements that are guided by the bearing cage 10. Furthermore the tool 80 has an actuating element 82 to enable the two bearing cage sections shells 81-1 and 81-2 of the tool 80 to be brought together, and thereby join the bearing cage sections 12-1 and 12-2.

According to exemplary embodiments, the tool 80 can enclose both bearing cage halves 12-1, 12-2 simultaneously and uniformly. That is, the inner diameter of the part of the tool 80 contacting the cage halves should correspond to the outer diameter of the bearing cage 10. The bearing cage section shells 81-1, 81-2 embracing the two cage halves 12-1 and 12-2 contact only the side rings of the bearing cage sections 12-1, 12-2 during assembly, in order to prevent damage to the rolling elements guided within the bearing cage sections. In other words the bearing cage section shells 81-1 and 81-2 each have side ring shell segments 83-1, 83-2 disposed at an axial distance from the bearing cage side rings, which side ring shell segments bring together the bearing cage side rings during assembly. The spacing between the side ring shell segments 83-1, 83-2 thus preferably corresponds to the axial spacing of the side rings or circumferential bridges of the bearing cage segments.

According to certain exemplary embodiments, a lever effect can be applied to the two bearing cage section shells 81-1, 81-2 through operation of the actuating element 82, in order to press the two shells 81-1 and 81-2 together during assembly.

It is characteristic of the assembly tool 80 that a transfer of the force from tool 80 into the bearing cage haves 12-1, 12-2 occurs via the side rings of the bearing cage 10. An enclosing of the cage halves 12-1, 12-2 via the shells 81-1 and 81-2 is thereby as high as possible. According to exemplary embodiments, the transfer of the force from the assembly tool 80 into the bearing cage halves 12-1, 12-2 occurs centrally in that a parting plane 84 of the plier-type tool 80 is offset for example 90° from the parting plane of the bearing cage 10. For easier handling a large leverage ratio to improve the hand levers 85-1 and 85-2 can be provided. That is, the hand levers 85-1 and 85-2 can be formed suitably long. At the same time, the distance from lever point 86 to the midpoint of a divided bearing cage 10 inserted in the shells 81-1, 81-2 is as large as possible, in order to achieve a favorable transfer of the force perpendicular to the plane of the cage lock elements 14 and 15, i.e. perpendicular to the bordering surfaces 13-1 and 13-2.

In accordance with the above-described exemplary embodiments, highly-loadable divided bearing cages can be obtained, for example for bearing applications in engines.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved split bearing cages and bearings containing the same, as well as methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Divided bearing cage
11 Cutting line
12 Bearing cage section
13 Bordering surface
14 Projection, spring, cam
15 Opening, groove
16 Bearing cage rotational axis
17 Main axis of projection or opening
18 Radial direction
19 Undercut, undercutting
20 Slot along the main axis
21 Tangential direction
22 Base region
23 Connecting region of the cage sectional plane
24 Contact region between projection and opening
61 Contact point
62 Contact point
63 Contact point
64 Contact point
80 Assembly tool
81 Bearing cage section shell
82 Actuating element
83 Side ring shell segment
84 Parting plane of the tool
85 Hand lever
112 Bearing cage section
114 Projection, spring, cam
115 Opening, groove
116 Bearing cage rotational axis
117 Main axis of projection or opening
118 Radial direction
    212 Bearing cage section
    214 Projection, spring, cam
215 Opening, groove
216 Bearing cage rotational axis
217 Main axis of projection or opening
218 Radial direction
312 Bearing cage section
314 Projection, spring, cam
315 Opening, groove
316 Bearing cage rotational axis
317 Main axis of projection or opening
318 Radial direction

The invention claimed is:

1. A split bearing cage for a rolling element bearing, comprising:
    at least a first bearing cage section and a second bearing cage section, each comprising two axially-spaced-apart side ring segments and a plurality of bridges connecting the side ring segments, the bridges defining pockets for accommodating and guiding rolling elements,
    wherein the bearing cage is split in its circumferential direction at or along at least one cutting line between the first and second bearing cage sections,
    a projection is formed on a first bordering surface of the first bearing cage section,
    an opening corresponding to the projection is formed in or on a mutually-opposing second bordering surface of the second bearing cage section, the projection and corresponding opening being configured to fix the first and second bordering surfaces to each other in three directions through a meshing or engagement of the projection and the corresponding opening, and
    a main axis of the projection and the corresponding opening extends at an angle ($\alpha$) that is oblique to a rotational axis of the bearing cage.

2. The split bearing cage according to claim 1, wherein the angle ($\alpha$) is greater than 0° and less than 10°.

3. The split bearing cage according to claim 1, wherein the projection formed on the first bordering surface is configured to be inserted in the circumferential direction into the corresponding opening formed on the second bordering surface.

4. The split bearing cage according to claim 1, wherein the projection has an undercut and has a substantially semicircular to circular or oval-segment-shaped cross-section in a plane perpendicular to its main axis,
    the corresponding opening also has a substantially semicircular to circular or oval-segment-shaped cross-section in a plane perpendicular to its main axis, and
    the cross-section of the projection at least substantially matches or corresponds to the cross-section of the corresponding opening.

5. The split bearing cage according to claim 1, wherein the projection and the corresponding opening extend in a direction perpendicular to their respective main axis in a range from 0.25 times to 0.4 times of the thickness of the radial bearing cage.

6. The split bearing cage according to claim 1, wherein the projection and the corresponding opening extend at least substantially along an entire axial width of the bearing cage.

7. The split bearing cage according to claim 1, wherein the first and second bordering surfaces have a minimum extension from the projection and the opening, respectively, to a radial end of the bordering surface of between 0.2 and 1 mm.

8. The split bearing cage according to claim 1, wherein the projection and the corresponding opening extend in a V-shaped, double-V-shaped, or X-shaped manner in their respective first and second bordering surfaces.

9. The split bearing cage according to claim 1, wherein the angle (α) is between 1° and 5°.

10. The split bearing cage according to claim 9, wherein the projection has an undercut and has a substantially semicircular to circular or oval-segment-shaped cross-section in a plane perpendicular to its main axis, the corresponding opening also has a substantially semicircular to circular or oval-segment-shaped cross-section in a plane perpendicular to its main axis, and the cross-section of the projection at least substantially matches or corresponds to the cross-section of the corresponding opening.

11. The split bearing cage according to claim 10, wherein the projection and the corresponding opening extend in a direction perpendicular to their respective main axis in a range from 0.25 times to 0.4 times of the thickness of the radial bearing cage and the projection and the corresponding opening extend at least substantially along an entire axial width of the bearing cage.

12. The split bearing cage according to claim 11, wherein the first and second bordering surfaces have a minimum extension from the projection and the opening, respectively, to a radial end of the bordering surface of between 0.2 and 1 mm.

13. The split bearing cage according to claim 12, wherein the projection has a slot defined along its main axis and the projection is thus elastic deformable perpendicular to its main axis, the slot has a length in a tangential direction of the bearing cage that is longer than the length of the projection in the tangential direction and the slot has a width perpendicular to the main axis of the projection that is between 0.2 times to 0.3 times the length of a radial extension of the projection.

14. The split bearing cage according to claim 1, wherein the projection has a slot defined along its main axis and the projection is thus elastic deformable perpendicular to its main axis.

15. The split bearing cage according to claim 14, wherein the slot has a length in a tangential direction of the bearing cage that is longer than the length of the projection in the tangential direction.

16. The split bearing cage according to claim 15, wherein the slot has a width perpendicular to the main axis of the projection that is between 0.2 times to 0.3 times the length of a radial extension of the projection.

* * * * *